US006345858B1

(12) United States Patent
Franklin et al.

(10) Patent No.: US 6,345,858 B1
(45) Date of Patent: Feb. 12, 2002

(54) WIDE BODY FOR AN OFF THE HIGHWAY TRUCK

(75) Inventors: Howard R. Franklin, Decatur; Theodore A. Moutrey, Taylorville, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/660,710

(22) Filed: Sep. 13, 2000

(51) Int. Cl.⁷ ............................................. B62D 33/00
(52) U.S. Cl. ...................................... 296/183; 296/184
(58) Field of Search ................................ 296/183, 184, 296/190.08

(56) References Cited

U.S. PATENT DOCUMENTS 4,668,058 A * 5/1987 Wright ........................ 350/582
5,899,520 A * 5/1999 Bryant ........................ 296/152
6,022,068 A * 2/2000 D'Amico ..................... 296/184

* cited by examiner

Primary Examiner—Dennis H. Pedder
(74) Attorney, Agent, or Firm—Fred J. Baehr

(57) ABSTRACT

A wide body for an off the highway truck having cab, a canopy extending from the wide body and over the cab, a side rear view mirror disposed on each side of the truck viewable from the cab and movable between a position within the width of the wide body and a position outside the width of the wide body and a mirror guard disposed on each side of the truck having a stationary portion disposed within the width of the wide body and a movable portion pivoting between a position within the width of the wide body and a position beyond the width of the wide body to prevent material spilling over the side of the wide body during filling operation breaking the mirror and to allow the wide body to pass through a repair shop door when the side rearview mirror and mirror guard are positioned within the width of the wide body.

15 Claims, 7 Drawing Sheets

Fig. 8.

Fig_9_

WIDE BODY FOR AN OFF THE HIGHWAY TRUCK

TECHNICAL FIELD

The invention relates generally to a wide body truck and, more particularly to an off the highway truck wide body truck having movable mirror guards for preventing side rearview mirrors from being broken by material spilling over the wide body during the filling operation.

BACKGROUND ART

Trucks that operate off the highway are not restricted to the maximum highway width. Off the highway wide body dump trucks are utilized in earth moving and mining operations where large quantities of material is loaded into the wide body dump truck and driven to a location where it is dumped. When utilized in a coal mining operation the width of wide width dump body may be increased, since coal has a lower density than rock and earth. Side rearview mirrors are required for safe operation of these trucks. If one of the mirrors is broken, government regulations require that the truck be taken out of service and that the mirror be replaced before the truck goes back into service. The large capital investment in these trucks makes any down time very costly. Prior to this invention, the side rearview mirrors were protected by mirror guards welded to the truck body this increased the overall width of the truck body. Normal maintenance and repairs of the wide body dump trucks is done in a repair shop so the wide body must fit through the repair shop door. Thus, the width and height of the wide body off the highway dump trucks is limited by the size of the door opening in the repair shop.

The present invention is directed to overcoming one or more of the problems or disadvantages associated with the prior art.

DISCLOSURE OF THE INVENTION

In one aspect of the present invention a wide body for an off the highway truck has a cab and a side rearview mirror viewable from the cab and movable between a position within the width of wide body and a position beyond the width of the wide body. The wide body comprises a maximized width, a canopy extending over the cab, the canopy having a width generally equal to the width of the wide body and a movable mirror guard. The movable mirror guard has a stationary portion rigidly fastened to the canopy within the width of the wide body and a movable portion movably attached to the stationary portion. The movable portion is movable between a position within the width of the wide body and a position beyond the width of the wide body and over the side rearview mirror when the side rearview mirror is positioned beyond the width of the wide body. The movable mirror guard and the side rearview mirror cooperate to allow the wide dump body to fit within a space slightly wider than the wide dump body when being positioned within the width of the wide body and cooperate to prevent a material spilling over the side of the wide body during filling operation from breaking the mirror and putting the truck out of service when being positioned beyond the width of the wide body.

BEST MODE FOR CARRYING OUT THE INVENTION

Figure 1:
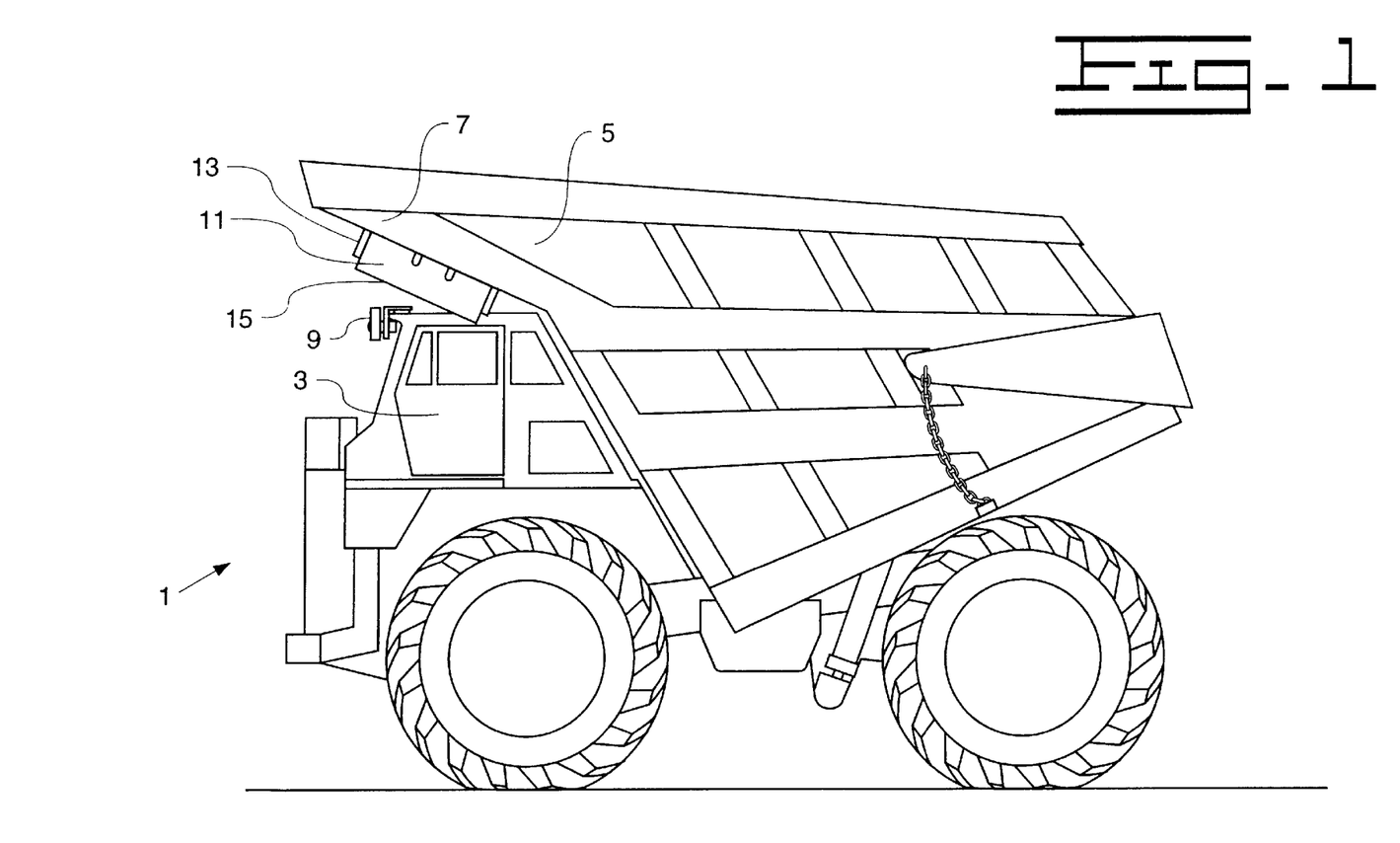
FIG. 1 is a diagrammatic side view of an off the highway truck with a wide body.

Referring now to the drawings in detail and in particular to FIG. 1, there is shown an off the highway truck 1 comprising a cab 3 and a wide body 5 having a maximized width and a canopy 7. The canopy 7 is generally the same width as the wide body 5 and extends over the cab 3. A side rearview mirror 9 is disposed on each side of the truck 1. Each side rearview mirror 9 is viewable from the cab 3. The side rearview mirrors 9 are movable between a position within the width of the wide body 5 and a position beyond the width of the wide body 5. A mirror guard 11 is disposed on each side and generally below the canopy 3. Each mirror guard 11 comprises a stationary portion 13 rigidly attached to the canopy 7 by welding or other means and a movable portion 15 movably attached to the stationary portion 13. The movable portion 15 moves between a position within the width of the wide body 5 and a position beyond the width of the wide body 5.

Figure 2:
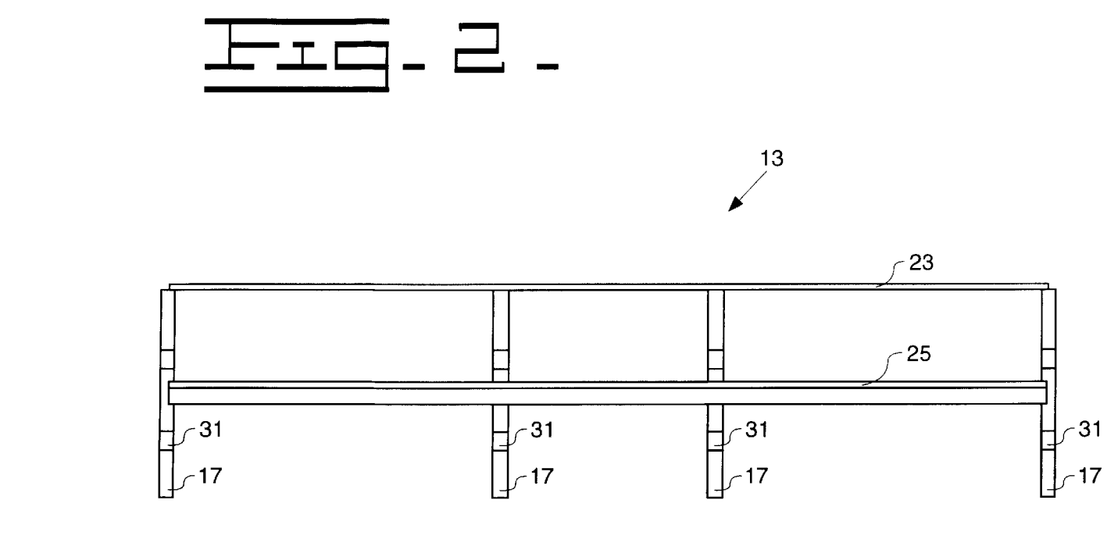
FIG. 2 is a plan view of a stationary portion of a movable mirror guard.
Figure 3:
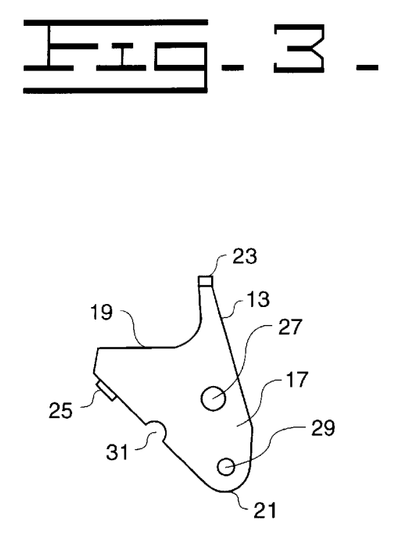
FIG. 3 is a side view of the stationary portion of the movable mirror guard.

Referring now to FIGS. 2 and 3 the stationary portion 13 includes a plurality of first triangular shaped plates 17, preferably four. Each triangular plate 17 has a base portion 19 that is cut away to fit the canopy 7 and an apex portion 21 that is rounded off. A pair of flat bars 23 and 25 are rigidly attached to the triangular shaped plates 17, by welding or other means, and are generally disposed parallel to each other. The flat bars 23 and 25 cooperate to position the triangular shaped plates 17 a predetermined distance apart and generally parallel to each other. Each first triangular shaped plate 17 has a first and a second hole 27 and 29, respectively. The first holes 27 are aligned on a common axis and the second holes 29 are aligned on a common axis. These common axes are parallel to each other and to the base portion 19. A round notch 31 is disposed on one side of the first triangular shaped plates 17. The notches 31 are aligned on a common axis that is parallel to the base portion 19 and the axis of the first and second holes 27 and 29.

Figure 4:
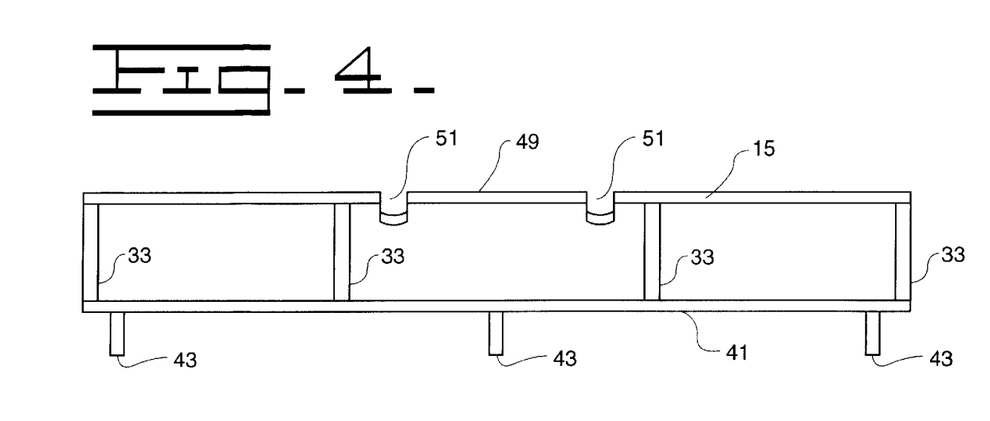
FIG. 4 is rear view of a movable portion of the movable mirror guard.
Figure 5:
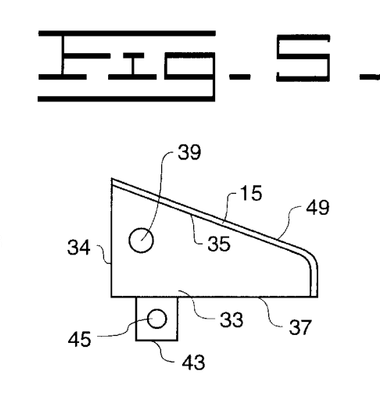
FIG. 5 is a side view of the movable portion of the movable mirror guard.
Figure 6:
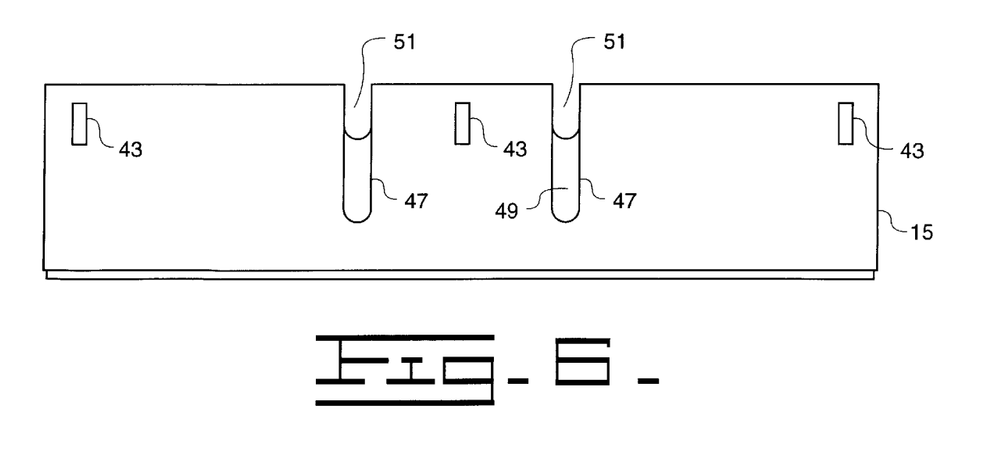
FIG. 6 is a bottom view of the movable portion of the movable mirror guard.

Referring now to FIGS. 4, 5 and 6 the movable portion 15 of the mirror guard 11 includes a plurality, preferably four, second or generally right triangular shaped plates 33 having a base 34, an apex portion 35 which is rounded off adjacent a hypotenuse or a first side at 35 and a second side 37 opposite the hypotenuse sides. A round hole 39 is disposed in each second or right triangular shaped plate 33. The round holes 39 are aligned on a common axis generally parallel to the base 34.

A bottom plate 41 is attached to the second side 39, by welding or other means. A plurality of rectangular shaped tabs 43 are attached to the underside of the bottom plate 41, by welding or other means. The tabs 43 each have round hole 45 aligned on a common axis. A pair of deep slots 47 are disposed in the bottom plate and register with two of the inside triangular shaped plates 17 of the stationary portion 13.

A top plate 49 conforming to the hypotenuse or first side 37 and the rounded off portion of the apex portion 35 and is attached thereto by welding or other means. The top plate 49 has a pair of shallow slots 51 that register with the two inside triangular shaped plates 17 of the stationary portion 13. The inside right triangular plates 33 are disposed outside the inside triangular shaped plates 17 of the stationary portion 13.

Figure 7:
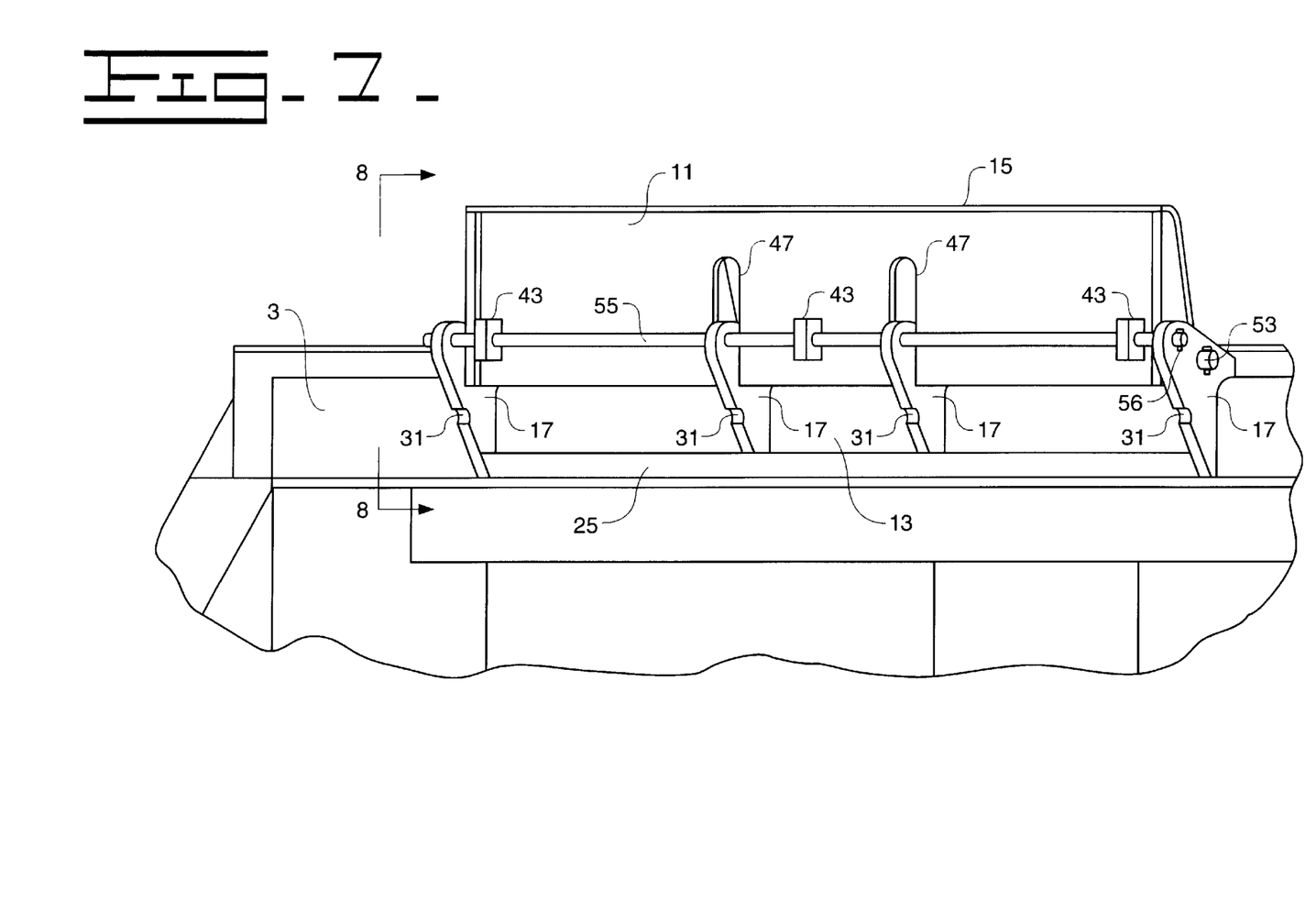
FIG. 7 is a partial view of a portion of a canopy over a cab looking up at the movable mirror guard.
Figure 8:
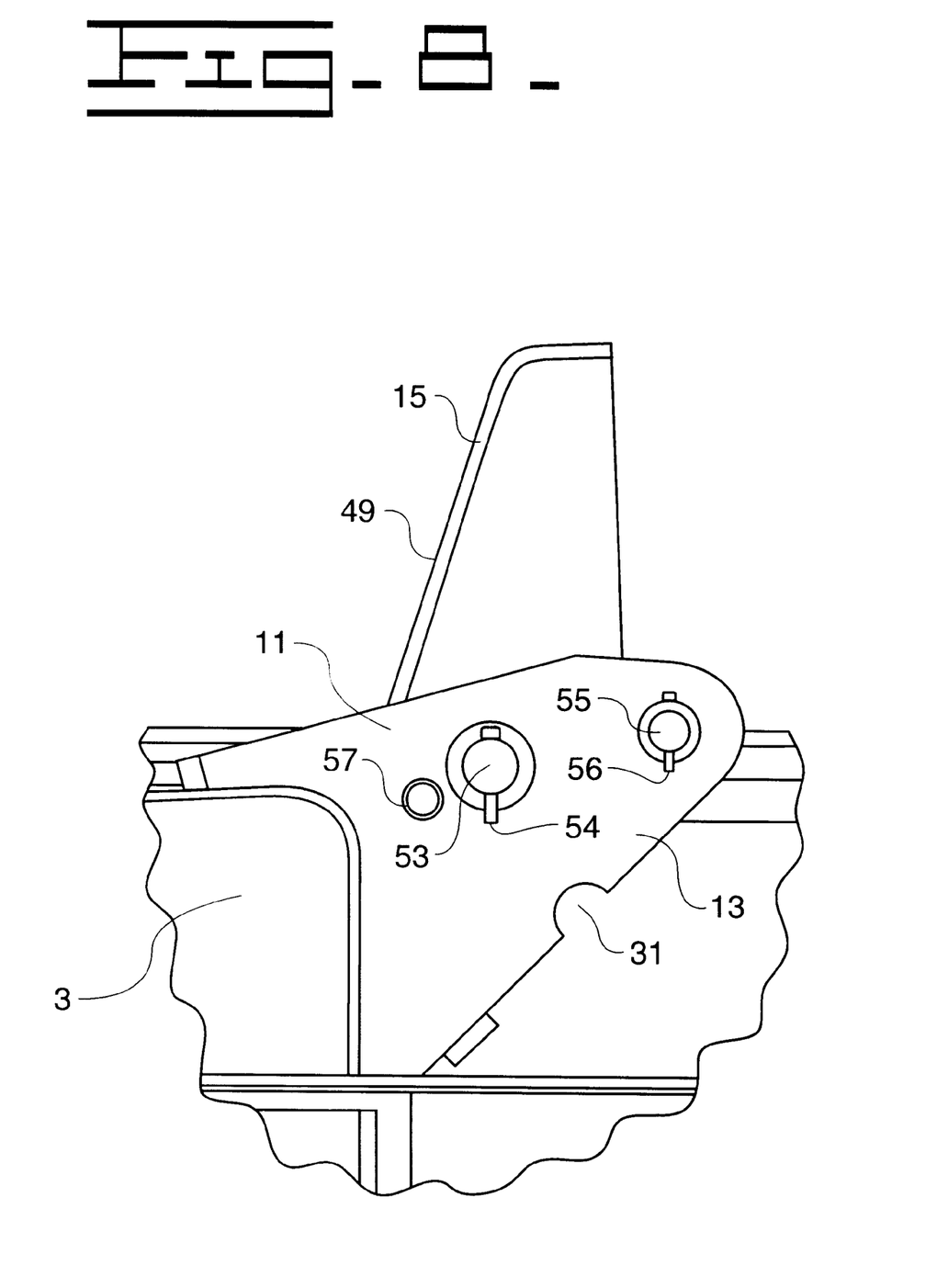
FIG. 8 is a partial sectional view taken on line VII—VII of FIG. 7.

FIGS. 7 and 8 show the movable portion 15 in its second position rotated outwardly about a shaft 53, which fits through the first holes 27 in the first triangular shaped plates 17 of the stationary portion 13 and through the holes 39 in the second or right triangular shaped plates 33 of the movable portion 15 allowing the movable portion 15 to pivot between a position within the width of the wide boy 4 and a position beyond the width of the wide body 5. The shaft 53 is held in place by a cotter pin 54 disposed in each end of the shaft 53. To hold the movable portion 15 in position beyond the width of the wide body 5, a pin 55 is fitted into the second hole 29 in the first triangular shaped plates 17 of the stationary portion 13 and into the holes 45 in the tabs 43 attached to the bottom plate 41 of the movable portion 15. A cotter pin 56 disposed in each end of the pin 55 holds the pin 55 in place. The outside triangular shaped plates 17 of the stationary portion 13 are disposed outside the outside right triangular plates 33 of the movable portion 15. A bolt 57 is threaded through one of the outside first triangular plates 17 of the stationary portion 13 and engages the outside adjacent second or right triangular shaped plate 33 preventing the movable portion 15 from rattling.

Figure 9:
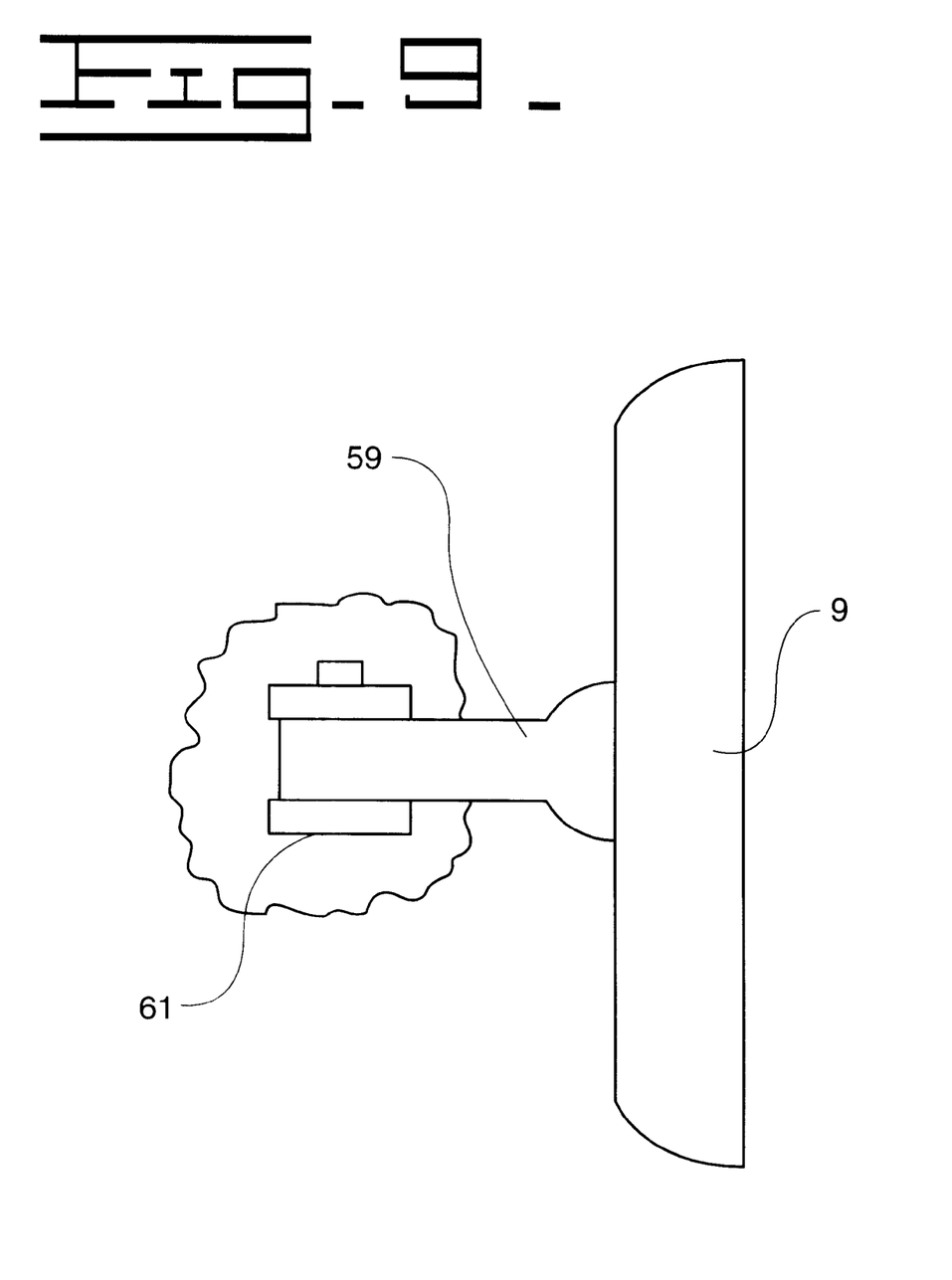
FIG. 9 is a diagrammatic view of a side rearview mirror movably attached to the truck.

FIG. 9 shows the side rear view mirrors 9 have an arm 59 attached to the truck 1 by a pivotal connection 61 on one end of the arm 59. This allows the mirrors 9 to be pivoted between a position within the width of the wide body 5 and a position beyond the wide body 5. A ball joint 63 on the other end of the arm 59 connects the arm 59 to the mirror 9 permitting adjusting the mirrors 9 to see behind the wide body 5 when viewing the mirrors 9 from the cab 3.

Figure 10:
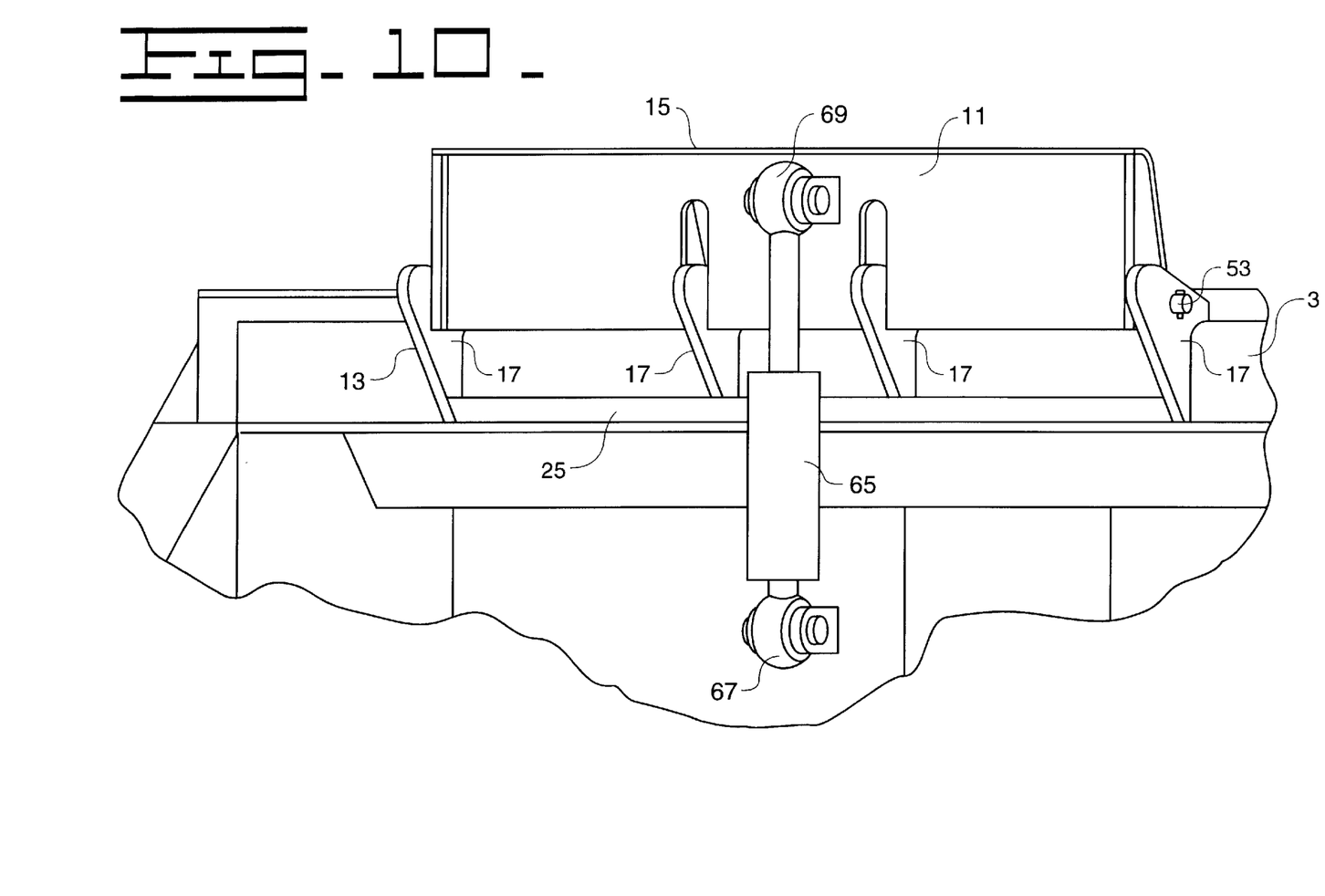
FIG. 10 is a diagrammatic partial view of a portion of the canopy over the cab looking up at the movable mirror guard showing an alternative embodiment utilizing a fluid actuated cylinder to operate the movable mirror guard.

Referring now to FIG. 10, there is shown a movable mirror guard similar to the one shown in FIGS. 2 through 8 except there is no through bolt 57 pin 55, tabs 43, round holes 45 and second holes 29 in the triangular plates 17. A fluid actuated cylinder 65 is pivotally connected to the movable portion 15 by a pivotal connection 69 and is pivotally connected to the canopy 7 by a pivotal connection 67. The cylinder 65 may be actuated by either a hydraulic or a pneumatic fluid. The cylinder 65 may be double acting. However, to provide fail safe operation and automatic return of the movable portion 15 to its position within the width of the wide body 5 upon fluid supply failure, the cylinder 65 should be single acting with a spring return.

The rear view mirrors 9 may also be fitted with a fluid operated cylinder (not shown) to move them between positions or they may be moved by a mechanism utilizing pivotal links or a cable pulled through a sheath (not shown) or a combination thereof operated from the cab 7.

Industrial Applicability

The wide body 5 for the off the highway truck 1 has a movable mirror guard 11 having the movable portion 15 pivotally rotated about a shaft 53 between the position within the width of the wide width body 5 and the position beyond the width of the wide body 5. When in the position beyond the width of the wide body, the pin 55 is inserted through the holes 29 and 45 in the stationary and movable portions 13 and 15 of the mirror guard 11 to hold the mirror guard 11 in the position over the rear view mirror 9 to protect the mirror 9 from material spilling over the side of the wide body 5 during the filling operation. To return the movable mirror guard 11 to the position within the width of the wide body 5, the pin 55 is removed and the movable portion 15 pivots downwardly to that position. The pin 55 is then inserted through the circular notches 31 in the stationary portion 13 and through the holes 45 in the tabs 43 in the movable portion 17. This holds the movable portion 17 within the width of the wide body 5 and keeps the pin 55 from becoming lost. The mirrors 9 are also moved into a position within the width of the wide body 5. With the mirrors 9 and mirror guards 11 positioned within the width of the wide body 5, the off the highway truck 1 with the wide body 5 will fit through the door in the repair shop. Providing movable rearview mirrors and movable mirror guards allows the width of the wide body to be maximized moving the center of the load forward for better weight distribution and reduces hauling cost.

By providing a fluid actuated cylinder 65 that moves the movable portion 15 of the mirror guard 11 between the position within the width of the wide body 5 and the position beyond the width of the wide body 5, the operator of the off the highway truck 1 with a wide body 5 can move the mirror guards 11 from the cab 3. Providing a single acting spring return cylinder 65 allows the off the highway truck to be driven into the repair shop when there has been a fluid supply failure.

Other aspects and features of the present invention can be obtained from a study of the drawings, the disclosure, and the appended claims.

What is claimed is:

1. A wide body for an off the highway truck having a cab and a side rearview mirror viewable from the cab and movable between a position within the width of wide body and a position beyond the width of the wide body; the wide body comprising a maximized width, a canopy extending over the cab, the canopy having a width generally equal to the width of the wide body and a movable mirror guard having a stationary portion rigidly fastened to the canopy within the width of the wide body and a movable portion movably attached to the stationary portion, the movable portion being movable between a position within the width of the wide body and a position beyond the width of the wide body and over the side rearview mirror when the side rearview mirror is positioned beyond the width of the wide dump body; the movable mirror guard and the side rearview mirror cooperating to allow the wide dump body to fit within a space slightly wider than the wide dump body when being positioned within the width of the wide body and cooperating to prevent a material spilling over the side of the wide body during filling operation from breaking the mirror and putting the truck out of service when being positioned beyond the width of the wide body.

2. The wide body for the off the highway truck as set forth in claim 1, wherein the stationary portion includes a plurality of first generally triangular shaped plates, each first triangular shaped plate having a base portion cut to fit the canopy, an apex portion, a pair of flat bars rigidly attached to the first triangular shaped plates to position the first triangular shaped plates generally parallel to each other at fixed distances apart, and an aligned hole with a common axis generally parallel to the base portion.

3. The wide body for the off the highway truck as set forth in claim 2, wherein the movable portion includes a plurality of second generally triangular shaped plates, each second triangular shaped plate having a base, an apex, a first side, a second side, and an aligned hole disposed on a common axis adjacent the base; a bottom plate being attached to the second side; a top plate conforming with and being attached to the first side; and a round shaft fitting into the holes in the second triangular shaped plates and the holes in the first triangular shaped plates of the stationary portion allowing the movable portion to rotate between the position within the width of the wide body and the position beyond the width of the wide body and over the mirrors when the mirrors are positioned beyond the wide body.

4. The wide body for the off the highway truck as set forth in claim 2, wherein the stationary portion includes four parallel first triangular shaped plates.

5. The wide body for the off the highway truck as set forth in claim 3, wherein the movable portion includes four parallel second triangular shaped plates.

6. The wide body for the off the highway truck as set forth in claim 5, wherein the stationary portion includes four parallel first triangular shaped plates, two of which are disposed outside of the two outside second triangular shaped plates of the movable portion.

7. The wide body for the off the highway truck as set forth in claim 6, wherein the movable portion includes a pair of short slots extending from an edge of the top plate and registering with the two inside first triangular shaped plates of the stationary portion and a pair of deeper slots extending from an edge of the bottom plate and registering with the two inside first triangular shaped plates of the stationary portion allowing the top plate to move between positions within and beyond the width of the wide body.

8. The wide body for the off the highway truck as set forth in claim 7, wherein the two inside first triangular plates of the stationary portion are disposed inside of two inside second triangular plates of the movable portion.

9. The wide body for the off the highway truck as set forth in claim 8, wherein the movable mirror guard includes a pin and each of the first triangular plates of the stationary portion includes a second hole disposed on a single axis and the movable portion includes a plurality of tabs extending below the bottom plate, each tab having an aligned hole disposed on a single axis and the pin fitting into the second holes in the first triangular plates and into the holes in the tabs holding the movable portion in the position beyond the width of the wide body and removing the pin allowing the movable portion to return to the position within the width of the wide body.

10. The wide body for the off the highway truck as set forth in claim 9, wherein each first triangular shaped plate of the stationary portion include a circular notch disposed on one side thereof and on a single axis allowing the pin to fitting into the holes in the tabs and into the circular notches holding the movable portion in the position within the width of the wide body and preventing the pin from becoming lost.

11. The wide body for the off the highway truck as set forth in claim 10, wherein the stationary portion includes a bolt threaded through one of the end first triangular plates engaging an adjacent end second triangular plate of the movable portion and preventing the movable portion from rattling by tightening the bolt against the adjacent end second triangular plate.

12. The wide body for an off the highway truck as set forth in claim 1, wherein the movable mirror guard includes a fluid actuated cylinder pivotally connected to the stationary portion and pivotally connected to the movable portion for moving the movable portion between the position within the width of the wide body and the position beyond the wide body.

13. The wide body for the off the highway truck as set forth in claim 8, wherein the movable mirror guard includes a fluid actuated cylinder pivotally connected to the stationary portion and pivotally connected to the movable portion for moving the movable portion between the position within the width of the wide body and the position beyond the wide body.

14. An off the highway truck comprising a cab, a wide body having a maximized width and a canopy extending over the cab, a side rearview mirror viewable from the cab and movable between a position within the width of the wide body and a position beyond the width of the wide body, and a movable mirror guard having a stationary portion rigidly fastened to the canopy within the width of the wide body and a movable portion movably attached to the stationary portion within the width of the wide body, the movable portion being movable between a position within the width of the wide body and a position beyond the width of the wide body and over the side rearview mirror when the side rearview mirror is positioned beyond the width of the wide dump body; the movable mirror guard and the side rearview mirror cooperating to allow the wide dump body to fit within a space slightly wider than the wide dump body when positioned within the width of the wide body and cooperating to prevent a material spilling over the side of the wide body during filling operation from breaking the mirror and putting the truck out of service when positioned beyond the width of the wide body.

15. A method of making a wide body for an off the highway truck having a cab and a side rear view mirror comprising the steps of:

maximizing the width of the wide body;

providing a side rearview mirror movable between a position within the width of the wide body and a position beyond the width of the wide dump body;

extending a forward portion of the wide body over the cab forming a canopy that is generally as wide as the wide body;

designing a movable mirror guard movable between a position within the wide body and a position beyond the wide body; and attaching the movable mirror guard to the canopy within the width of the wide body; and positioning the mirror guard on the canopy over the side rearview mirror when both are positioned beyond the wide body.

* * * * *